(No Model.)
A. MITSCHERLICH.
BOILING FIBER WITH SULPHITES FOR THE MANUFACTURE OF PAPER PULP.
No. 337,694. Patented Mar. 9, 1886.
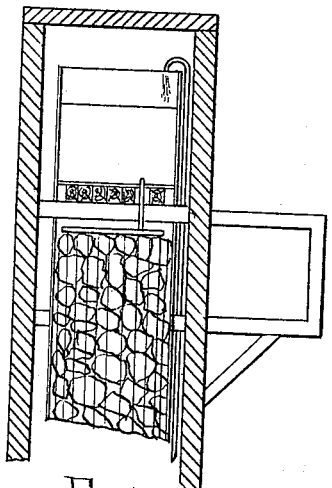
Fig. 1.
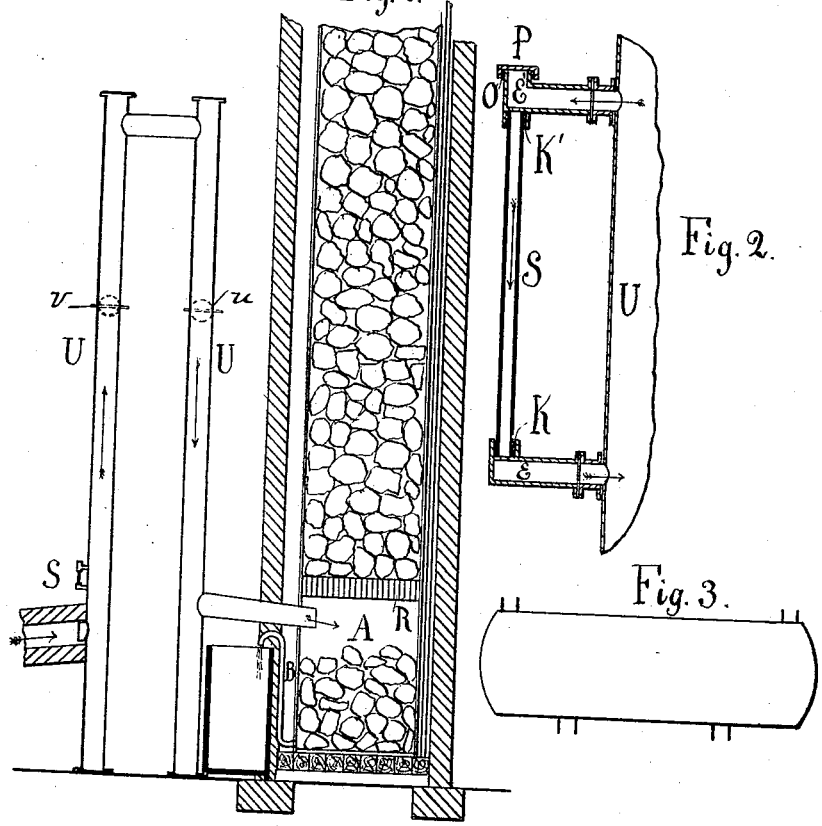
Fig. 2.
Fig. 3.
Witnesses.
William Miller
Inventor
Alexander Mitscherlich
by Van Santvoord & Hauff
his attys

UNITED STATES PATENT OFFICE.

ALEXANDER MITSCHERLICH, OF FREIBURG, BADEN, GERMAMY.

BOILING FIBERS WITH SULPHITES FOR THE MANUFACTURE OF PAPER-PULP.

SPECIFICATION forming part of Letters Patent No. 337,694, dated March 9, 1886.

Application filed September 11, 1884. Serial No. 142,773. (No specimens.) Patented in France August 23, 1884, No. 156,171; in England August 26, 1884, No. 11,655; in Italy October 7, 1884, No. 17,330 and No. 17,331, and in Austria-Hungary September 14, 1885, No. 17,670 and No. 49,311.

*To all whom it may concern:*

Be it known that I, ALEXANDER MITSCHERLICH, a subject of the Grand Duke of Baden, residing at Freiburg, Grand Duchy of Baden, German Empire, have invented new and useful Improvements in Boiling Fibers with Sulphites for the Manufacture of Paper-Pulp, of which the following is a specification.

This invention relates to improvements in the process of producing sulphite cellulose; and it consists in the novel features of procedure described and claimed in the following specification, and illustrated in the accompanying drawings, in which—

Figure 1 represents a vertical longitudinal cross-section of the tower which I employ in the production of the solvent. Fig. 2 is a section, on a larger scale than the preceding figure, of detail parts. Fig. 3 is an elevation of the boiler employed in the process.

In the treatment of wood with solutions of sulphurous acid and combinations for the preparation of paper-pulp and by-products, improvements have been made which form the subject of the present invention, and which relate as well to the preparation or treatment of the raw materials as to the boiling process and the apparatus employed for that purpose.

The production of the sulphurous compounds is effected in the case of bisulphite of lime (acid sulphate of lime) generally by conducting over moderately-sized pieces of carbonate of lime which are confined in a tower simultaneously (from above) water, and from below a current of sulphurous acid produced by burning sulphur, or by calcining sulpho-metals and sulpho-ores. By this method the result may be a sulphurous solution containing a great surplus of sulphurous acid and polythionic acids if the management of the process is not a very careful one in the conditions prescribed. The present invention avoids these evils even in the roasting in which by means of special appliances a more intensive draft is produced to carry off the gases better and the admission of air is lessened, and in which gases are produced free of sulphur, sulphurated hydrogen, and other impurities, and these sulphurous gases can be tested as to the amount of sulphur they contain by the peculiar application of a sublimation-tube, and, finally, the absorption of the sulphurous acids thus produced takes place in such a way that the presence of sulphurous acid and of polythionic acids is avoided.

The roasting of the raw material for the production of sulphurous acid is done, as is well known, in kilns in which the sulphur or sulpho-metals are burned. In these kilns it is of particular importance that the material of which they are constructed does not allow the air to penetrate. If the ordinary material is used for the purpose, the exact regulation of the draft, as will be mentioned further on, is rendered impossible, for so much air finds its way into the kiln through the numerous little crevices which are always to be found in common masonry, and even through the pores of the bricks themselves, that the material to be roasted would keep on roasting after the proper aperture for the admission of air has been closed. It is, therefore, necessary in the construction of these kilns that at least one layer of the masonry be of a material that prevents air from penetrating. This air-tight material is produced in various ways, one of which is to steep the heated bricks in tar and to connect them firmly when building up the kiln by means of a thickish mortar, which must be of such a nature that it hardens gradually, shows little or no porosity, and is not at all affected by temperatures prevalent in the kiln, either by sulphuric or sulphurous acids. A mixture of tar and of any fine-grained substance unaffected by acids—such as fine quartz-sand, sieved coal, ashes, pulverized slag, &c.—is well adapted for the cementing material.

The roasting in the kiln and the controlling of the gases that arise must be conducted in such a manner that the latter acquire a certain velocity only; for, in case of too quick a motion, the gases, when pyrites are roasted or sulphur burned, easily get too thin, owing to too much air entering the kiln, and the result of this is, that when the latter occurs too-greatly-diluted solutions are formed. If the motion of the gases is too slow, the burning in the kilns will be incomplete, free sulphur gets into the absorption appliance, and polythionic acid is formed, which has a very injurious effect on the solution just produced.

The creation and regulation of draft for avoiding the evil mentioned is effected by the application of an ascending and descending U-shaped flue, U U, as represented in Fig. 1 of the accompanying drawings. In this case the motion of the gas is produced by the hot gases from the roasting-kiln passage having first to ascend in this U-shaped flue, which is effected by the heat due to their original great development. Owing to the cooling in their passage through this tube they will descend on reaching the bent part of the tube U, and the high specific weight of the cold gases will produce an augmentation of draft.

By means of the cooling appliance described it is easy, with a proportionally strong pressure, to make the gases go farther and pass through the tower from the bottom upward (even if there is a strong counter-pressure acting against them) without its being necessary to use any further appliances, such as fans, injectors, &c. The force of the draft depends on the height chosen for the tube system, and it can, furthermore, be regulated by using slides and dampers at $u$, Fig. 1. Owing to the cooling of the gases caused by this arrangement, they are reduced to a temperature below 86° Fahrenheit, which is of particular importance in the subsequent absorption process for the practical chemical effect and the complete utilization of the gases. Should the gases not be sufficiently cooled by the above process, which, however, will seldom be the case, a further cooling can be very conveniently effected by incasing the downward part of the tube with boards at a small distance therefrom. The atmospheric air will be warmed in the intervening space by the tube, and consequently be forced in strongly from below and escape at the top. By means of the strong current of air thus produced a sufficient cooling of the tube will be attained. The gases issuing from the roasting-kiln may also contain, if the draft be too weak, sulphur-vapors, the penetration of which into the tower would be very injurious for the solution formed, owing to the formation of polythionic acids.

In order to be able to ascertain easily the presence of free sulphur in these gases flowing out of the roasting-kiln, and in order to prevent the formation of free sulphur by adequate regulation of the draft, a so-called "sublimation-tube," S, Figs. 1 and 2, is fitted into the tube system, which takes up the gases flowing out of the roasting-kiln, as close as possible to the point of outflow in the kiln in the ascending part of the cooling-tube, as may be seen in Fig. 1, in combination with the other parts of the apparatus, and in Fig. 2, designed on a larger scale. A glass tube is vertically fitted into the two elbow tube-pieces, E and E', so as to rest upon a projection of the tube-piece E, and made removable through the opening P of the tube-piece E'. When in operation, the connections K K' and O are made air-tight with clay. Through this apparatus pass constantly in the directions of the arrows small quantities of the gases escaping from the kiln. The free sulphur that may be present is precipitated at once by the cooling on the sides of the glass tube S, and will be seen there as a yellowish coating, and in such a case the precautionary measures in the regulation of the draft already mentioned against this formation can be taken immediately. If a covering of sulphur is formed in the glass tube, the latter is removed and replaced by a clean one. The gases which pass out of the cooling-tube U, and have a certain velocity, are allowed to enter the absorption-tower in which the lime is and over which water is conducted from above in a fine spray. It must be borne in mind here that particularly in the production of bisulphite of lime a very great quantity of carbonate of lime is requisite, which exposes large surfaces to the sulphurous acid passing through, (tufallous limestone is most practical,) and experience has shown that with a daily production of twenty-five cubic meters of solution, about ten thousand kilograms of lime must be used, a greater quantity of lime being by no means injurious.

In order to prevent in the solution thus forming the development of free sulphurous acids in the tower itself, the gases are not allowed to enter the latter quite at the bottom, but flow in at a certain height above it. It may be seen in Fig. 1 of the drawings the current of gas discharges below the grate R. In the space underneath this grate is a layer, A, of limestone, into which the solution forming in the tower enters. By this the free sulphurous acid that may still be present in the solution is taken up, so that the solution flowing out through the communicating-tube B into suitable reservoirs contains only the smallest quantity of free sulphurous acid.

Instead of using the appliances described above, the solution produced may be allowed to pass into particular vessels which contain the original material to be employed (that is to say, for bisulphite the carbonate of lime) in such a manner that the fluid comes as much as possible in contact with the material—for instance, in such a way that the fluid flows into the vessel below and flows out at the top. For these vessels both the reservoirs, for the ready solution, and also intermediate vessels, can be used. If desired, both arrangements can be used combined. If the sulphurous-acid compound is to be made of a substance soluble in water, then this watery solution is allowed, just as the water in the description given above of the lime combination, to pass through the tower, which latter is filled in this case, instead of with limestone, with a porous and firm material unaffected by this process—as, for instance, with coke, stove-bricks, &c. The temperature stated is likewise in this case imperative. In the arrangement described, and especially when a high tower is used, a complete utilization of the sulphurous acid produced in the rosting-kiln will be effected in the chemical reaction, so that all chance of its escaping into the open air is avoided, and at the same time a sulphurous-acid solution is formed which is either completely free or at least almost completely free of free sulphurous acid.

In order to obtain a uniform and constantly good sulphite cellulose, it is necessary to introduce the wood in definite dimensions into the boiling apparatus, and careful experiments have led to the result that with fir (*Picea abies L.* or *Picea excelsa*) disks of about from fifteen millimeters to thirty-eight millimeters thickness (cut across the grain) or slabs of about from five millimeters to fifteen millimeters (cut parallel with the fiber) should be used, while with poplar, (*Populus italica*,) Scotch fir, (*Pinus silvestris*,) and pine wood (*Abies alba* or *Pinus picea*) disks cut across the grain of from fifteen millimeters to seventy-six millimeters thickness, and even more, and with the grain from five millimeters to thirty-eight millimeters may be used, with beach (*Fagus silvatica*) from fifteen millimeters to thirty-eight millimeters, and five millimeters to thirty-eight millimeters, oak (*Quercus*) from fifteen millimeters to twenty millimeters, and five millimeters to twenty millimeters, and analogous woods of similar dimensions. It is here to be particularly understood that for obtaining a uniform and a perfect material with boiling of not excessive length, the dimensions given are of the greatest importance and absolutely necessary, and that this constitutes an integrate part of the improved process. Thus if larger dimensions be employed, the fact that the internal portions are with difficulty perfectly treated is of great detriment to the boiling process, which may thereby become entirely useless. If it be endeavored to perfect the boiling by carrying it out slowly, several days would be required for one boiling, which would render the process impracticable. If, on the other hand, smaller dimensions are employed than those indicated, the circulation of the liquid will be very much impeded, and it would then be necessary to employ boilers to which a rotary motion is imparted or to obviate this difficulty by the use of circulating-pipes. Both expedients have, however, great disadvantages; also if the wood is of very small dimensions, the boilers can only be charged with small quantities in proportion to their volume, because such small pieces form very loose heaps.

As the above dimensions allow of a free circulation of the liquid in the boiler, it is possible to use boilers of as large dimensions as can be manufactured. This is again of the greatest importance for the sulphite-cellulose manufacture, because in such boilers it is easy to maintain the temperatures described in the specification to my previous patent, No. 284,319, dated September 4, 1883.

In using wood prepared as above described there may exist, even if all other conditions for the production of good cellulose are complied with, bundles of fiber of a brown color, which may result from the originally perfectly white bast fibers of the wood. This defect renders the cellulose of considerably less value on account of the paper becoming spotty. By carefully removing these objectionable bast fibers the said brown bundles of fiber are avoided.

Formerly Scotch fir, (*Pinus silvestris,*) larch, (*Larix,*) and similar woods were excluded from use in the manufacture of sulphite fiber, because a portion of these woods did not become perfectly reduced even after several boilings; but by removing the core thereof, which forms the part which does not become easily reduced, these woods will yield as good cellulose, with the above process, as fir, (*Picea abies* or *Picea excelsa.*) Materials in a small state of subdivision—such as sawdust, &c.—are also disadvantageous, because they cannot be perfectly boiled in large boilers on account of the imperfect condition of the heat, caused by their fine state of subdivision. This disadvantage is easily obviated by the following arrangement, so that even the smallest particles of wood can be effectually treated in the largest boilers: Between the pieces of wood of the above-indicated dimensions heaps of the sawdust or other small material are distributed in such manner that the liquid, which can circulate freely between the pieces of wood, also passes among the said heaps. In consequence thereof they become sufficiently impregnated, if not too large, so that the smallest wood particles will become reduced during the usual boiling process.

This invention also relates to the construction of the pulp-boilers.

In order to produce a perfect sulphite cellulose, it is essentially necessary to use boilers of as large dimensions as possible, as already stated.

In order to effect a quick filling and emptying of the boiler, it is provided with man-holes at the points indicated on the drawings. By the position of these at the under side it is possible to place workmen on both sides of the man-holes in the boiler, whereby it can be quickly emptied. Furthermore, by the position of the man-holes with suitable regulation of the steam inlet and outlet taps, the steam can be distributed perfectly uniformly through the wood in the steaming operation. Furthermore, it has proved to be very advantageous to fix the necessary boiler-fittings on the man-hole covers, because by fixing them on the sides of the boiler dangerous leakages may be produced, while there would be caused no great damage on the man-hole covers on account of the greater thickness thereof, particularly as they may be so fixed that the iron of the cover need not be entirely bored through, and under any circumstances the covers can be easily replaced. The hermetic closing of the man-holes in the top of the boiler has caused great difficulties. Lead appeared to be the only suitable packing material; but with lengthened use great disadvantages appeared—as, for instance, the considerable compression of the lead of the man-holes, whereby it quickly becomes deteriorated, &c. The use of a thick paste of cellulose placed upon the joint to be packed has proved, on account of its inexpensive nature, to be particularly advantageous in such pulp-works, and it obviates all inconveniences arising from a bad packing when a substance such as sulphurous acid is used. Another improvement consists in employing a constant higher pressure in the heating-pipes constructed of hard lead than in the boiler itself. The lead pipes, which are very difficult to maintain perfectly tight, easily become choked, when leakages occur, by the formation of sulphite compounds that dissolve with difficulty—for instance, when using bisulphite of lime in boiling by the separation of sulphite of lime. These obstructions can hinder the heating of the liquid, and may cause the spoiling of a charge, which generally represents a considerable value. By always using a higher pressure in the heating-pipes than outside, the liquid can never pass from the boiler into the pipes when a leak occurs in the latter, but only steam or water can pass from the latter into the former, and thus any such obstruction of the pipes is avoided. Even with the most careful maintenance of the proper temperature and regular progress of the boiling, it has occurred that under certain circumstances the pressure-gage indicates a high pressure that does not correspond to the temperature, in consequence of which the high pressure existing in the boiler caused the liquid therein to be forced through the smallest leaks into the pipes, thus producing the above-named evils. It has been found that under the said circumstances the fault lies in the fact that the boiler was filled with too much liquid. Such overfilling is not of much importance with other materials that contain air—as, for instance, unsteamed wood—because the elasticity of the air contained in the wood prevents the attainment of too great a pressure on the expansion of the liquid on heating. This air has, however, been completely removed when the wood has been previously steamed, and in consequence hereof very high pressure may be produced at comparatively low temperatures, which may cause the bursting of the strongest boilers. In order to avoid this danger with certainty, a very simple remedy has been found—namely, not to fill the boilers beyond ninety-nine one-hundredths of their capacity.

It has been found convenient in the case of horizontal boilers of about three hundred and ninety-six millimeters diameter to leave a space of about thirty centimeters from the crown free of liquid.

In my previously-mentioned patent the sulphite-boilers were described as protected by a peculiar cemented layer of thin sheet-lead and brick-work.

It has been proved that in lining the iron boilers inside with other descriptions of lead coverings than that described—for instance, by soldering the same—such lead is attacked by the lye in a short time to such an extent that it requires to be frequently renewed. The considerable defects that are caused by this are, great deterioration of the iron boilers, with danger of explosion, and extensive repairs, combined with long interruptions of the working. If, however, the lead lining is further protected by a lining of cemented brick-work, neither a chemical nor a mechanical destruction thereof will take place, and it will hardly become deteriorated at all.

In the manufacture of sulphite cellulose further disadvantages have arisen through the inconvenience caused by allowing the large quantity of waste liquid to flow away into the drains while hot, in which condition it has a very objectionable smell. These disadvantages can be very considerable for the manufacture under certain circumstances, as the authorities may oppose the granting of concessions, and these may even be entirely refused on that ground. By the following method these disadvantages are entirely obviated: The discharge-pipe from the boiler is connected to a large tank sunk in the ground having a capacity of at least double that of the liquid discharged at one operation. The sides of this tank are formed either of brick-work or wood, and it is closed in with boarding, on which is laid a layer of earth; or it may be inclosed by brick-work arches. The discharge-pipe from the boiler is made to enter this tank at a point below the middle of its height. A pipe with small bore leads into the drain. All the cold waste liquors are by preference also discharged into this tank. The liquid passing from time to time in large quantities from the boiler into this tank becomes sufficiently cooled by admixture with the cooled liquid contained therein, so that no objectionable vapors will be discharged therefrom into the air as it flows off. If this liquid be discharged into a stream of about one thousand times the volume it will become sufficiently diluted to be harmless for animals or vegetation. The use of iron pipes, more particularly cast-iron, for leading off the fluid is particularly convenient, because a black deposit is formed where the liquid comes in contact, which effectually protects the iron against the further action of the liquid. Lastly, it is to be particularly observed that a deterioration of the cellulose may be easily effected by the discoloring thereof during the boiling, this taking place either in separate bundles of fiber, as above mentioned, or throughout the mass. By means of many experiments it has been proved that this defect is produced by subjecting the wood to a temperature of about 212° Fahrenheit without the presence of the sulphite solution, either before or after the boiling, or by letting the boiled mass stand for a length of time at about this temperature. This must consequently be entirely avoided, and the boiled mass should be cooled off at once as soon as the liquor is discharged.

What I claim as new, and desire to secure by Letters Patent, is—

1. As a preliminary step in the manufacture of sulphite cellulose, the method herein described of producing a sulphite solution free or nearly free from free sulphurous acid by conducting the gases from the roasting-kiln through the free system described to cool the current to about 86° Fahrenheit, and then presenting the gases in a tower to solid alkali in the presence of water, the solid alkali being located both above the inlet-orifice of the gas and below the same to absorb any free acid, substantially as shown and described.

2. The herein-described process for the manufacture of sulphite cellulose from wood-stock, which process consists, essentially, in first reducing the wood-stock to the herein-stated dimensions, and removing the objectionable bast fibers and cores; secondly, in steaming the wood-stock thus prepared to drive off the air, and, finally, boiling the same with a sulphite solution which is free, or nearly so, from free sulphurous acids, substantially as shown and described.

3. The herein-described method for the manufacture of sulphite cellulose from wood-stock in a divided state—such as sawdust—which consists in distributing the divided material in heaps between the larger pieces, then steaming the mass to drive off the air, and finally boiling the same with a solution of a sulphurous-acid compound which is free, or nearly so, from free sulphurous acid, substantially as described.

4. The combination, with the tower, of the bent flues U, leading from the roasting-kiln and communicating with the tower, and the indicating-tube S in said flue, substantially as shown and described.

In testimony whereof I have signed my name to this specification in the presence of two subscribing witnesses.

ALEXANDER MITSCHERLICH.

Witnesses:
A. S. HOGUE,
J. GRUND.